(12) United States Patent
Ellis

(10) Patent No.: US 7,281,737 B2
(45) Date of Patent: Oct. 16, 2007

(54) TRUCK RIDE QUALITY IMPROVER

(76) Inventor: William Gregory Ellis, 3509 E. Elma St., Camarillo, CA (US) 93010

( * ) Notice: Subject to any disclaimer, the term of this patent is extended or adjusted under 35 U.S.C. 154(b) by 73 days.

(21) Appl. No.: 11/053,978

(22) Filed: Feb. 8, 2005

(65) Prior Publication Data

US 2006/0175820 A1    Aug. 10, 2006

(51) Int. Cl.
*B60S 9/00* (2006.01)

(52) U.S. Cl. .................. 280/759; 280/757; 224/403

(58) Field of Classification Search ............ 280/757, 280/758, 759; 224/403, 557; 296/3, 37.6
See application file for complete search history.

(56) References Cited

U.S. PATENT DOCUMENTS

| | | | |
|---|---|---|---|
| 3,565,457 A | 2/1971 | James | |
| 3,655,216 A | 4/1972 | Watts | |
| 4,190,281 A | 2/1980 | Chandler | |
| 5,172,953 A | 12/1992 | Chamberlain | |
| 5,330,227 A | 7/1994 | Anderson | |
| 5,494,315 A | 2/1996 | Heltenburg | |
| 5,897,138 A | 4/1999 | Hall | |
| 5,941,565 A | 8/1999 | Clendenin | |
| 6,079,741 A | 6/2000 | Maver | |
| 6,283,527 B1 | 9/2001 | Desmarais | |
| 2004/0164537 A1* | 8/2004 | Niemela | 280/759 |

FOREIGN PATENT DOCUMENTS

EP    1 074 458 A2    7/2001

* cited by examiner

*Primary Examiner*—Paul N. Dickson
*Assistant Examiner*—Tiffany L. Webb
(74) *Attorney, Agent, or Firm*—W. D. English, III

(57) ABSTRACT

A unitary ballast device for attachment to the rear portion of a pickup truck cargo bed using mounting pins, chain links, shackles and affixed eyelets in the interior of the vehicle cargo bed. The ballast device is composed of steel or other heavy metal, and the surface coated in rubber to reduce damage to the cargo bed and any cargo present in the cargo bed. The device is positioned laterally at the rear of the vehicle bed and is releasable by detaching from affixed eyelets in the cargo bed and can be modified to include a second metal base for increased dampening effect. The device can remain in place with cargo loads present with little risk of damage to the load due to the beveled edges and rubber coating of the base, thereby increasing ease of use and efficiency.

6 Claims, 3 Drawing Sheets

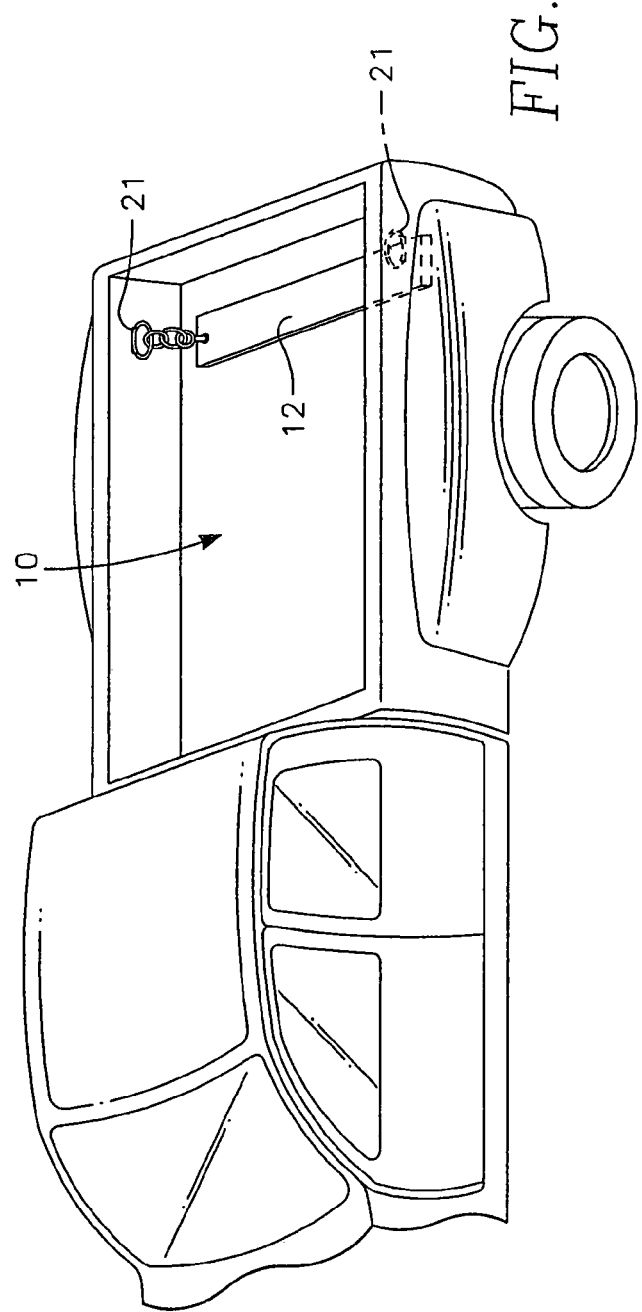

TRUCK RIDE QUALITY IMPROVER

FIELD OF THE INVENTION

This invention relates to the field of vehicle ballast and stabilization, and more particularly to a method and apparatus utilizing a simple unitary ballast and weight device for increasing traction in the rear wheels of a pickup truck and improving overall ride quality thereof.

BACKGROUND OF THE INVENTION

It has long been an understood disadvantage to drivers of pickup trucks that when the cargo bed is empty there exists a significant amount of bounce while driving the truck. This occurs because the trucks are built with rear-wheel drive and are generally engineered to achieve optimal handling with a full cargo load. Pickup trucks are not always driven with a full cargo bed, particularly when driving to pick up a load or driving after unloading previously transported cargo. Furthermore, with the increased popularity of using pickup trucks as passenger vehicles, often times while the cargo bed is empty, there is an increased need for improving quality of ride.

In the past, drivers of pickup trucks have instituted their own quick and dirty method of reducing the bounce created by driving with an empty cargo bed. This has involved the loading of various media into the cargo bed, such as sand bags, concrete, weights, wood blocks, etc. This method is generally ineffective in that the weight is unevenly distributed throughout the cargo bed and has a propensity to slip and move while the vehicle is in use. The uneven distribution leads to a minimized amount of bounce reduction. Furthermore, the fact that the items placed in the cargo bed are generally large numbers of small items, these items move around the bed according to the movement of the truck and can cause damage to the interior of the cargo bed.

A great variety of more complicated and more specialized methods and apparatus have been conceived, designed, and utilized in the past to stabilize a vehicle under various circumstances and to add ballast to more effectively control operation of the vehicle. Some prior applications have been proposed for overcoming both traction problems and weight distribution problems in small pick up trucks by means of affixing containers into various parts of the cargo bed that can be filled with weighted media, such as water or sand, to weigh down the cargo bed when the bed is empty. Approaches that involve the filling and emptying of containers of weighted media, such as U.S. Pat. No. 6,283,527 to Desmarais, U.S. Pat. No. 6,079,741 to Maver, U.S. Pat. No. 5,897,138 to Hall, U.S. Pat. No. 5,494,315 to Heltenburg, U.S. Pat. No. 5,330,227 to Anderson and U.S. Pat. No. 4,190,281 to Chandler require the use of a significant amount of cargo bed space and the labor of filling and emptying the weighted media, such as water of sand. Some of these approaches attempt to minimize the use of space in the cargo bed by placing the containers in wheel wells or on the sidewalls of the cargo bed (U.S. Pat. No. 6,079,741 to Maver, U.S. Pat. No. 5,494,315 to Heltenburg and U.S. Pat. No. 4,190,281 to Chandler). However, the labor of filling and emptying the weighted media still exists.

U.S. Pat. No. 6,283,527 to Desmarais and U.S. Pat. No. 5,330,227 to Anderson teach methods that fill a multiplicity of elongated parts that cover the entire cargo bed area and are relatively small in width to minimize the consumption of cargo space. Both of these approaches require bolting the apparatus to the cargo bed, thus causing permanent structural change the bed itself and requiring more labor in installation. In addition, both of these approaches involve complex interaction between the component parts relative to the approach of the current invention.

U.S. Pat. No. 5,897,138 to Hall teaches a ballast system including a receptacle placed laterally at the rear of the vehicle bed, attached to the vehicle through flexible straps. Like the methods described above, this system requires that the receptacle be filled and drained with weighted media as needed. The present invention is similar in approach as it is positioned at the rear of the vehicle and attached to the vehicle through existing components of the cargo bed itself. However, the present invention does not require the filling and emptying of weighted media and consumes a significantly smaller portion of the cargo space.

Similar to the other methods involving the addition of weighted media to the apparatus, U.S. Pat. No. 5,941,565 to Clendenin, Jr. discloses an apparatus with a rectangular base that fits between the wheel wells constructed to hold an array of concrete or cinder blocks over the rear axle of the vehicle. The apparatus further contains a removable rack for use in the transportation of cargo. Again, for ballast purposes, this approach requires the addition and removal of the concrete or cinder blocks to achieve the improvement in traction and reduction in bounce while driving with an empty cargo bed. Furthermore, the weight is contained in the center of the cargo bed, between the wheel wells, rather than in the rear of the vehicle, thereby reducing the efficiency of the quality of ride.

U.S. Pat. No. 5,172,953 to Chamberlain involves a pickup truck bed liner that incorporates a ballast means in the bed liner itself. Like the other approaches previously mentioned, this ballast involves the use of adding and filling weighted media into the ballast portion of the bed liner itself. This approach involves the installation of the related bed liner as well. For pickup trucks that already contain bed liners or for drivers who, for one reason or another, do not wish to purchase the bed liner associated with this ballast, this method does not satisfy their need.

U.S. Pat. No. 3,655,216 to Watts and U.S. Pat. No. 3,565,457 to James disclose vehicle-stabilizing devices similar to the present invention. These methods involve the placement of a device in the rear of a vehicle with the aim to reduce skidding and dampening vibration. Since these devices are designed to prevent skidding rather than to reduce bounce and increase traction, they contain complex inner mechanics composed of spring mechanisms to keep the weight of the vehicle centered. The Watts patent requires the use of lubricant as the inner workings of the device has moving parts. This device includes a system of guides, weights and springs to help keep weight stabilized in the center of the vehicle. This device serves a distinctly different purpose from the present invention and involves complex, moving parts. These same disadvantages exist in the James patent.

European Pat. No. EP 1 074 458 A2 to Schott discloses a ballast weight arrangement for a working vehicle. This device is composed of a ballast weight support in the transverse plane of the vehicle involving interlocking ballast weights. This system is designed primarily for large, agricultural vehicles, such as tractors. The device is structured to trail the vehicle body with a series of interlocking weights as needed to lend stability to the vehicle. This device is specialized for these large vehicles and is not readily adaptable to more typical pickup trucks. It is complex relatively to the present invention, requiring larger and more numerous parts to operate. The device is not designed to rest inside a pickup truck cargo bed.

Consequently, a need exists for a simple, compact device that is easy to install, consumes a negligible amount of cargo space and does not require the filling and emptying, or addition of, weighted media to fulfill its ballast purpose.

SUMMARY OF THE INVENTION

In the preferred embodiment of the invention, a unitary steel or similar rigid metal plate is fabricated with rolled or beveled edges and with mounting holes on either end thereof, and is configured to lie on the floor of and across the rear bed of a conventional pickup truck which effectively dampens violent bounce when traversing bumpy highways. Mounting pins are inserted in to the mounting holes that are attached through chain links to a shackle and pin for attachment to eyelets permanently affixed to the interior sides of the pickup truck bed.

In an alternative embodiment of the invention, where additional ballast weight is needed, a second identical steel plate may be mounted on top of the first member.

OBJECTS OF THE INVENTION

The principal object of the invention is to reduce bounce in pickup trucks with empty cargo beds while driving by placing a compact ballast device in the rear of the cargo bed.

Another object of the invention is increased driving safety by increasing traction to the vehicle, particularly while driving over icy, snowy or muddy conditions.

Another object of the invention is to allow for ease of installation and removal of the ballast device without making permanent changes to the cargo bed itself.

Another object of the invention is to allow the addition of cargo the pickup truck without the need of removing the ballast device. By beveling the top edges of the metal base and coating the entire metal base with rubber, the risk of damage to cargo placed in the cargo bed is significantly reduced.

BRIEF DESCRIPTION OF THE DRAWING

FIG. 1 illustrates a perspective view of a pickup with the invention locked in the rear bed thereof.

FIG. 2 depicts a perspective view of the invention.

DETAILED DESCRIPTION OF AN ENABLING AND PREFERRED EMBODIMENT

Figure 3:
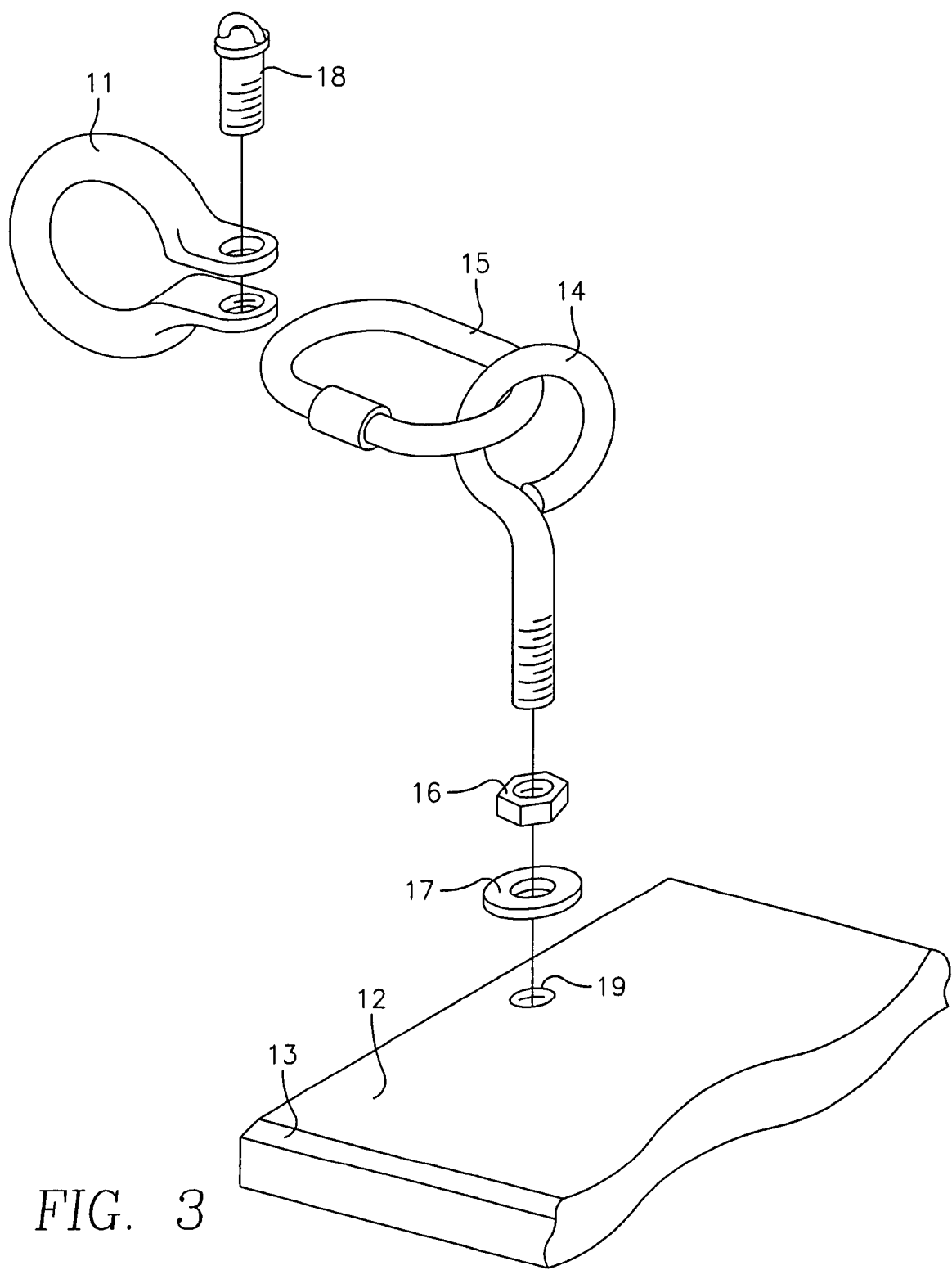
FIG. 3 depicts an exploded perspective view of one end of the invention.

For a better understanding of the invention, turning now to the drawings, FIG. 1 illustrates a perspective view of how the base 12 of the ballast device is placed in the cargo bed of the pickup truck 10 and attached to the permanently affixed eyelets inside the cargo bed 21. Note that the device is attached at the rear of the cargo bed for increased efficiency rather than over the wheel wells, thereby maximizing the available space left in the cargo bed as well as placing the weight in the optimal position to reduce bounce and increase traction.

FIG. 2 illustrates a perspective view of the invention outside of the context of the vehicle cargo bed. In the preferred embodiment, the metal base 12 has been modified to contain a beveled edge 13 and is coated with rubber in order to reduce damage to the cargo bed itself and to any cargo placed therein while the device remains in place. FIG. 2 displays the mounting device 14 already mounted to the base 12 and attached to one chain link 15 with the chain link 15 then being attached to a shackle 11, secured by a pin 18 to be attached to the permanently affixed eyelet in the bed of the pickup truck 21.

FIG. 3 illustrates the exploded view of the invention. The base 12 with beveled edge 13 is shown with the hole 19 for placement of the mounting pin 14 with a nut 16 and gasket 17 to secure the mounting pin 14 in place. Also shown is one chain link 15 for attachment to the mounting pin 14 to be attached to the shackle 11, secured by a pin 18 to then be attached to the permanently affixed eyelet in the bed of the cargo bed 21.

Figure 4:
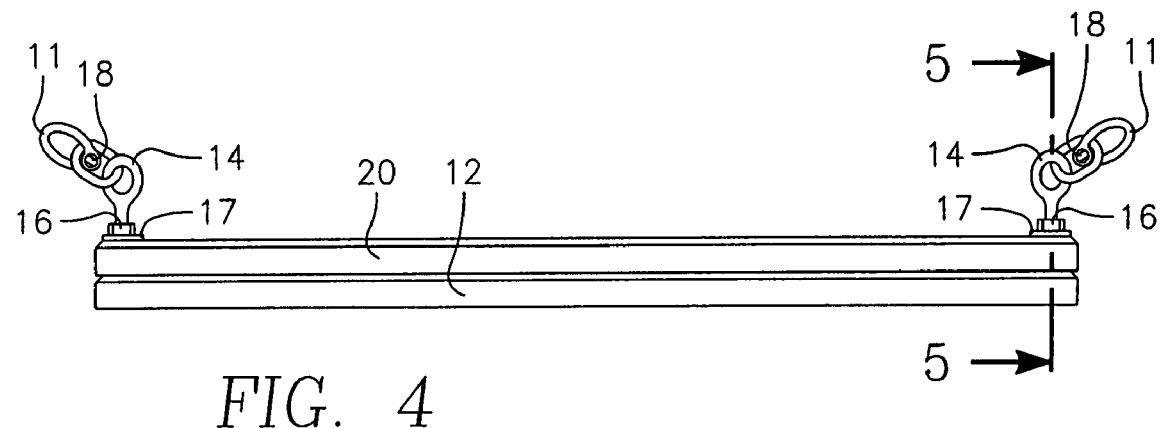
FIG. 4 illustrates a side view of the invention of an alternative embodiment utilizing a pair of plates for added dampening effect.
Figure 5:
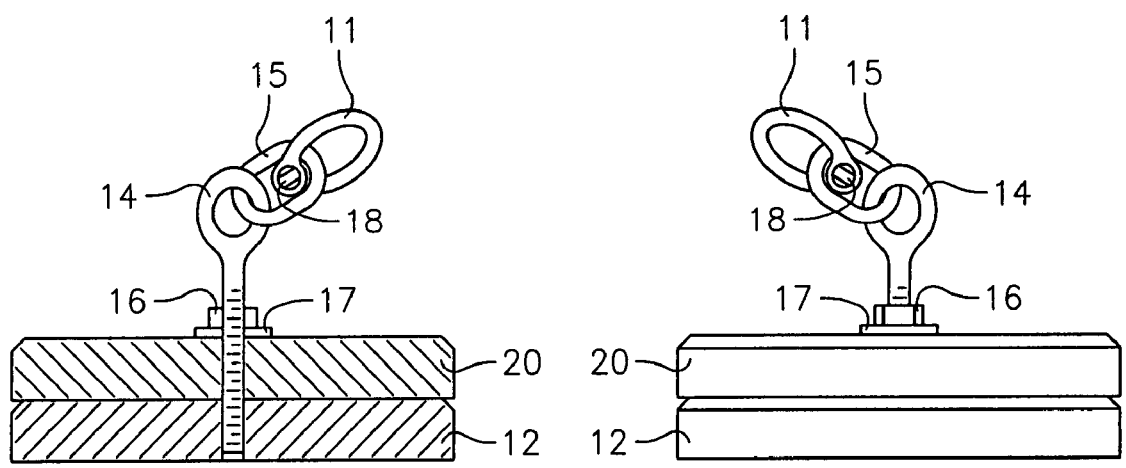
FIG. 5 describes a side view of FIG. 4 and a cross section of FIG. 4 illustrating the attaching mechanism.

FIG. 4 illustrates a side view of the alternative embodiment including a second base 20 affixed to the metal base 12 for increased dampening. In this alternative embodiment, the mounting pin 14 is affixed through the nut 16 and gasket 17 through the second base 20 and into the main base 12. The attachment of the mounting pin 14 through the second base 20 and original base 12 is also seen in FIG. 5, but in side view and cross-sectional form.

The illustrations and examples provided herein are for explanatory purposes and are not intended to limit the scope of the appended claims, as those skilled in the art will make modifications to the invention for particular vehicle sizes and types and road conditions.

I claim:

1. An apparatus for increasing traction in the rear wheels of a pickup truck and improving ride quality of said pickup truck cargo bed with eyelets affixed to the interior sides of said pickup truck cargo bed, comprising:
    a rectangular metal base, said base containing at least two holes, said holes situated on opposing ends of said base;
    a pair of mounting pins inserted into said holes in said base;
    at least one chain link;
    a shackle attaching the last link of said chain link to said affixed eyelets on said interior sides of said pickup truck cargo bed; and
    a pin securing said shackle around said last link and said affixed eyelets on said interior sides of said pickup truck cargo bed.

2. Apparatus according to claim 1 wherein said rectangular base contains a rubber coated finish.

3. Apparatus according to claim 1 wherein a multiplicity of rectangular metal bases is attached via said mounting pin for increased improvement of quality of ride.

4. A method for increasing traction in the rear wheels of a pickup truck and improving ride quality of a cargo beds of said pickup truck with eyelets affixed to interior sides of said pickup truck cargo bed, comprising this steps of:
    affixing a pair of mounting pins to a rectangular metal base, said base containing holes, said holes situated on opposing ends of said base;
    connecting said mounting pins to at least one chain link;

attaching said chain link to a shackle that is then attached to affixed eyelets on opposing sides of said interior side of said pickup truck cargo bed; and
securing said shackle with a pin.

5. The method according to claim 4 wherein said rectangular base contains a rubber coated finish.

6. The method according to claim 4 wherein a multiplicity of rectangular metal bases is attached via said mounting pin for increased improvement of quality of ride.

* * * * *